W. A. PRENTISS.
SPOOL.
APPLICATION FILED APR. 30, 1919.

1,316,972.

Patented Sept. 23, 1919.
2 SHEETS—SHEET 1.

WITNESS:
B. A. Seaver.

INVENTOR.
William A. Prentiss,
BY
Harry W. Bowen
ATTORNEY.

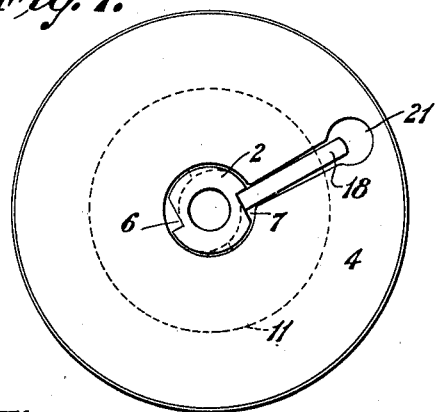
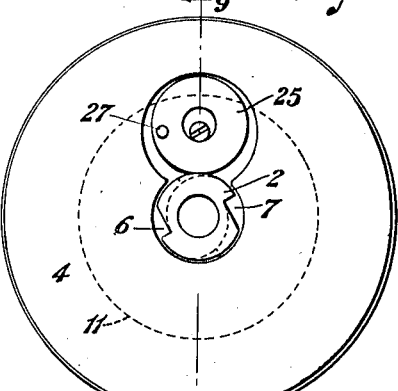
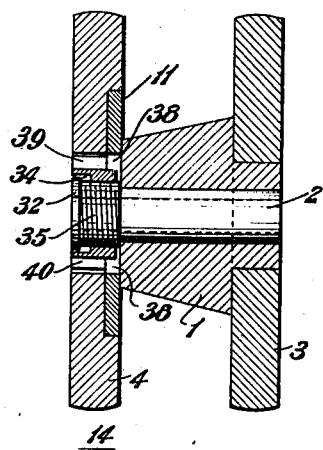
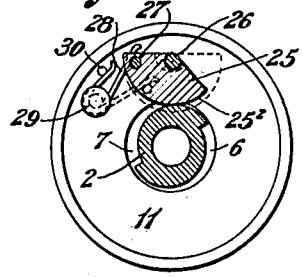
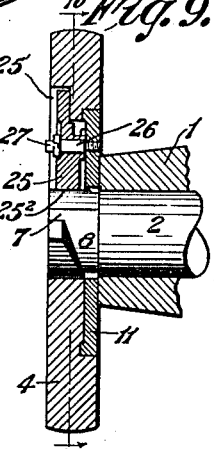
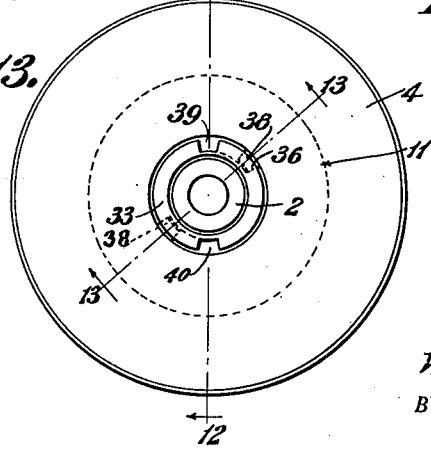
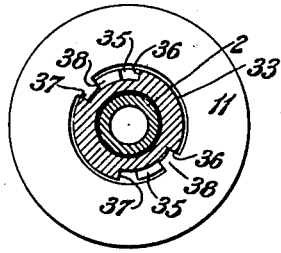

UNITED STATES PATENT OFFICE.

WILLIAM A. PRENTISS, OF HOLYOKE, MASSACHUSETTS, ASSIGNOR TO GEORGE W. PRENTISS & COMPANY, OF HOLYOKE, MASSACHUSETTS.

SPOOL.

1,316,972.   Specification of Letters Patent.   Patented Sept. 23, 1919.

Application filed April 30, 1919. Serial No. 293,831.

*To all whom it may concern:*

Be it known that I, WILLIAM A. PRENTISS, a citizen of the United States of America, residing at Holyoke, in the county of Hampden and Commonwealth of Massachusetts, have invented certain new and useful Improvements in Spools, of which the following is a specification.

This invention relates to improvements in spools for receiving coils of wire which are to be used in machines for stitching together articles with wire as in stapling machines. The invention, broadly, comprises a spool having a fixed and a removable head, or end pieces that are connected together by means of a hub and core element. The hub is preferably made tapering to permit easy insertion and removal of a coil of wire. The removable head is provided with means for quickly and securely attaching and detaching the same to and from the hub and clamping it in place when in use. An object of the invention is to provide a spool in which the removable head is so formed that the clamping means for the same is located below the plane of the outer surface of the head, whereby the frictional means which is employed to prevent the wire from being drawn off too rapidly, or, for preventing the spool from running away, which means is usually a device that presses against the outer ends of the spool and will not obstruct the rotation of the spool during the unwinding operation. The invention includes, in addition to the hub, a core-member or sleeve having an opening extending therethrough to receive the supporting pin on which the spool turns, one end of which projects beyond the end of the hub, said sleeve having mutilated or partially formed teeth or grooves, and the detachable head having a plate secured thereto with projections that enter the teeth or grooves of the iron sleeve and locking means carried by the detachable head for clamping the same to the sleeve, the lock in one form of my invention being preferably located on the outer face of the removable head, and its normal or locking position being below the plane of the outer surface of the detachable head.

Referring to the drawings:

Fig. 7 shows a slight modification in which the clamping or thumb piece is so located on the removable head that when the removable head of the spool is rotated to bring the same against the end of the hub, the clamping thumb piece will enter one of the cut-away portions of the sleeve of the spool.

Figs. 8, 9 and 10 are further modifications in which an eccentrically arranged plate is provided to lock the head to the sleeve and having suitable means for normally retaining the plate in frictional engagement with the sleeve; Fig. 9 being a sectional view on the line 9—9 of Fig. 8, and Fig. 10 being a sectional view of Fig. 9 on the line 10—10.

Figs. 11, 12, 13 and 14 are further modifications in which a nut is rotated by the head when the same is turned on the sleeve for drawing the head toward the end of the hub. These figures show the details of this modification; Fig. 12 being a sectional view on the line 12—12 of Fig. 11; Fig. 13 being a sectional view on the line 13—13 of Fig. 11; and Fig. 14 being a sectional view on the line 14—14 of Fig. 13.

Figure 1:
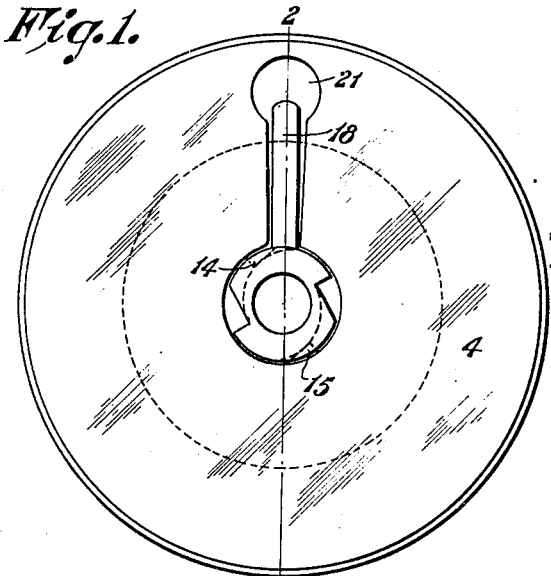
Figure 1 is an end view of the detachable head showing a thumb-lock and the metal plate secured thereto and having projections which enter the grooves that are formed in the iron sleeve.
Figure 2:
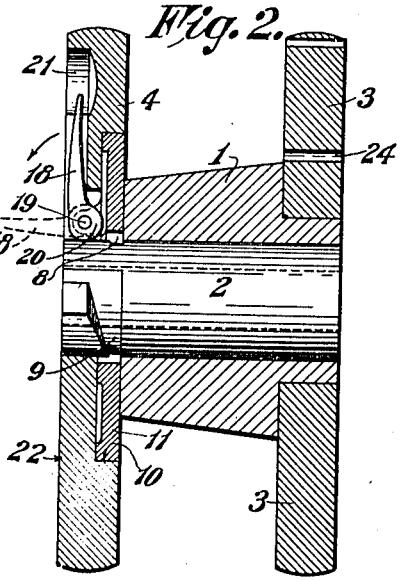
Fig. 2 is a vertical sectional view on the plane represented by the line 2—2 of Fig. 1, passing through the axis of the spool and illustrating the tapered hub, the iron sleeve and the manner of securing the detachable head to the sleeve.
Figure 5:
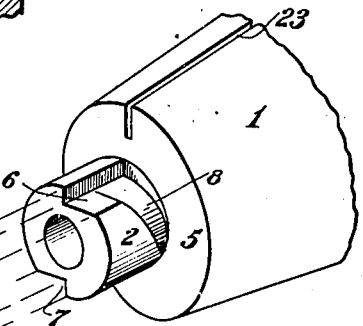
Fig. 5 is a detail perspective view of the end of the hub showing the groove or kerf therein for receiving the inner end of a coil of ribbon wire, also the iron sleeve formed with the tapered spiral grooves for locking the removable head in place.

Referring to the drawings in detail: 1 designates the tapered hub, 2 the iron sleeve passing therethrough and which receives the supporting pin of the machine about which the spool revolves when the wire is unwound from the spool. The fixed head is indicated at 3 and the removable head at 4. The head 3 is secured to the hub 1 in any suitable manner. The iron sleeve 2 is secured to the hub 1 by a driving fit. Referring to Figs. 2 and 5, the iron sleeve 2 projects beyond the outer face or end 5 of the hub and is formed with the cut-away portions indicated at 6 and 7, which extend parallel with the axis of the hub. At the inner end of the cut-away portions are spirally arranged and tapered recesses, or grooves 8, and 9, which form in effect, mutilated or partially formed teeth.

Figure 3:
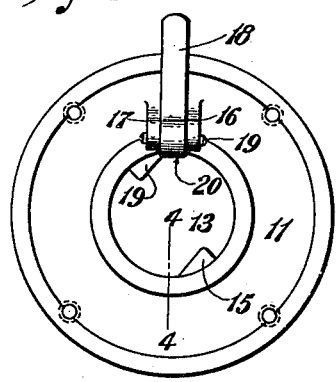
Fig. 3 is a detail view of the locking plate which is secured to the inner surface of the detachable head and showing the inwardly projecting lugs and the thumb lock.
Figure 4:
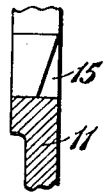
Fig. 4 is a detail sectional view on the line 4—4 of Fig. 3 showing the tapered construction of one of the locking lugs on the plate.
Figure 6:
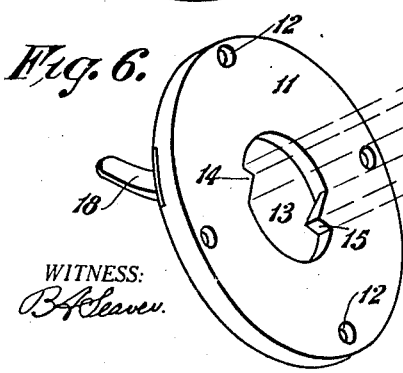
Fig. 6 is a detail perspective view of the plate which is secured to the inner surface of the removable head and illustrating the lugs which engage the spiral grooves of the iron sleeve.

Referring now to the construction of the removable head 4, this part of the device is formed with an annular recessed portion 10 (see Fig. 2). On the inner face thereof and located in this recess is an iron plate 11, a detail of which is shown in Figs. 3 and 6. This plate is attached to the head 4 by means of screws passing through the openings 12 and is formed with an axially arranged opening therethrough, indicated at 13, which is slightly larger than the diameter of the iron sleeve 2. The border of the opening 13 of the plate 11 is formed with the inwardly extending projections 14 and 15, which projections enter the cut-away portions 6 and 7 of the sleeve 2 and then pass into the curved or spirally arranged recesses 8 and 9 when the head is turned slightly so that these projections will pass to the inner ends of the spirally curved grooves 8 and 9. As these grooves are tapered, the head 4 is automatically drawn inward against the end of the hub 1. In order to lock the head in this position on the iron sleeve 2, a thumb construction is provided which is clearly shown in Fig. 3 and comprises the ears 16 and 17. Located between these ears is a thumb or lever piece 18 and that is pivotally connected to the ears by means of a pin 19 which is clearly shown in Fig. 2. The thumb lock is formed with an eccentric edge or surface 20, whereby when the piece 18 is moved into the dotted line position shown in Fig. 2, the head 4 can be readily slipped into place on the sleeve 2 and then rotated as described. The piece 18 is now moved into the full line position, causing the eccentric surface 20 to engage the outer surface of the iron sleeve 2 and then lock the head 4 securely to the sleeve, as is readily understood. It will be noticed that the piece 18 is located in a recess 21 of the removable head 4 whereby the same is located below the plane of the outer surface 22 of the removable head 4. For the purpose of securing the coil of wire to the core 1, the groove 23 is cut in the hub, shown in Fig. 5, when the wire is a ribbon structure, and, if the wire is circular, the inner end of the coil is passed through the opening 24 of the fixed head 3.

It will be seen from this description that I have provided a spool for receiving coils of wire, in which one of the heads is removable, and, provided with means for locking the head in place, said means being located below the plane of the outer surface of the removable head, also a structure that is comparatively inexpensive to make and one that is very durable and rigid in structure.

Referring to Fig. 7, it will be noticed that the thumb lock or piece 18 instead of engaging the curved portion of the sleeve 2 as in Fig. 3, is so located on the end piece 4 as to enter one of the cut away portions 6 or 7 of the sleeve 2. This arrangement effectually prevents all danger of the head 4 working loose.

Referring to Figs. 8, 9 and 10, 25 designates an eccentric plate that is pivotally secured to the iron plate 11, by means of the screw 26 and is located in a recess 25' of the head piece 4. The plate 25 carries a pin 27 against which one end of the coiled spring 28 bears. This spring passes around the screw 29 that is attached to the plate 11. The other end of the spring bears against the stop 30, on the plate 11. The normal tendency of this spring is to turn the plate 25 on its pivot 26 so as to bring its eccentric edge $25^2$ against the outer curved surface of the sleeve 2. In order to release the grip of the eccentric plate 25 from the sleeve 2 and remove the head 4, the operator turns the plate 25 by means of the pin 27, which releases the frictional grip of the plate 25 on the sleeve 2, whereby the head 4 can be rotated so that it is released from the spiral grooves 8 and can be removed axially. When the head is replaced, the reverse operation will take place. It is inserted on the core 2 and the projections 14 and 15 enter the threads 8 and upon the rotation of the plate it is moved toward the end of the hub 1. The operator then releases the eccentric plate 25, whereby the spring 30 moves the same into gripping relation with the core 2.

Referring to the modifications shown in Figs. 11, 12, 13 and 14 the sleeve 2 is formed with threads 31 near its outer end. 32 is a collar which forms an integral part of the sleeve 2. 33 is a nut that engages the threads 31 of the sleeve 2. This nut is formed with a shoulder 34 which engages the collar 32 to prevent its removal from the sleeve. The inner end of the nut 33 is cut away on its opposite sides, as indicated at 35 to form the shoulders 36 and 37 at the opposite ends of the cut away part. The plate 11 is formed with the oppositely disposed lugs 38 which engage the shoulders 36 and 37 in order to turn the nut on the sleeve 2 when the removable head 4 is rotated for the purpose of drawing or moving the same against the end of the hub 1 as shown in Fig. 13. In order to place the removable head 4 on the core 2 after a coil of wire has been placed on the hub 1, the nut 33 is formed with the oppositely disposed parallel arranged grooves 39 and 40 through which the lugs 38 pass. These grooves and lugs are shown in Figs. 11 and 12 before the removable head 4 is rotated, and in Fig. 13 after the head has been rotated to draw the head against the end of the hub 1. It will be seen from the construction shown in these figures that the head 4 may be readily placed on and locked to the sleeve 2 by simply passing the lugs 38 through the grooves 39 and 40, then rotating the head which will cause the lugs 38 to engage a shoulder at the end of the cut away part 35, whereby the nut 33 will be turned on the threaded part 31 of the sleeve until the head 4 is carried against the end of the hub 1.

From this description it will be seen that I have provided different forms of constructions for quickly removing and securing the removable head of a wire holding spool in place, and one that will not interfere with the frictional or brake construction.

What I claim is:

1. A spool device for holding a coil of wire, in combination, a hub, of a fixed and a removable head, a sleeve in the hub and projecting beyond one end of the hub, means for securing the removable head to the sleeve comprising a plate on the removable head, a lock operating device on the plate and means for locating the locking device in the removable head below the plane of the outer face of the removable head.

2. In a spool for holding a coil of wire, a hub, a sleeve in the hub and having a grooved cut-away portion, a removable head, a plate thereon having projections for entering said grooved cut-away portions for drawing the head against the end of the hub as the head is revolved, and means for locking the head in this position on the sleeve and against the end of the hub.

3. A spool for holding a coil of wire while being unwound, and comprising, in combination, a hub, a head secured thereto, a sleeve in the hub, and projecting from one end of the hub, a removable head, and means including a locking device, the operating part of which is located below the plane of the outer surface of the removable head, whereby said surface is free from obstruction during the unwinding operation of the coil.

4. A spool for holding a coil of wire while being unwound, a hub on which the coil is placed, a head fixed to the hub, a sleeve in the hub and having a grooved projecting end, said groove being spiral in form, means for temporarily securing the head to the projecting end, said means including a plate having projections or lugs for entering the grooved part of the sleeve, and a locking device having an eccentric or cam surface for engaging the projecting end of the sleeve.

5. In a spool for holding a coil of wire while being unwound, a hub, a sleeve extending through the hub and having an end that is formed with a cut-away portion, the inner end of the cut away portion having a spirally formed groove, a removable head designed for attachment to the sleeve, a plate on the head having an opening through the same and lugs in the opening for engaging the spirally formed grooves of the sleeve, and means normally below the plane of the outer surface of the removable head for locking the same to the sleeve.

6. A spool for supporting wire while being unwound and comprising a fixed and a removable head, a hub, a sleeve in the hub, the removable head having a recess below its outer end surface, a locking device for securing the head to the sleeve, the operative part of the locking device being located in the recess, for the purpose described.

7. A spool construction having, in combination, a hub, a sleeve therein and projecting beyond the hub, a removable head, means for locking the head to the sleeve and comprising a nut engaging the projecting end of the sleeve, the nut having shoulders, a plate on the head and formed with an opening, having projections on the border of the openings to engage the shoulders of the nut for operating the nut when the head is turned for moving the head against the end of the hub.

WILLIAM A. PRENTISS.

DISCLAIMER.

1,316,972.— *William A. Prentiss*, Holyoke, Mass. SPOOL. Patent dated September 23, 1919. Disclaimer filed February 9, 1921, by the patentee.

Enters this disclaimer—

"To that part of the claims in said specification which relates to and includes the latch 18 and the parts which coöperate therewith and designated by the reference-numerals, 2, 6, 7, 8, 9, 14, 15, 16, and 17, in Figs. 1, 2, 3, 4, 5, 6, 7, and 8, respectively, of the specification of said patent."

[*Official Gazette February 22, 1921.*]